US012644793B2

(12) United States Patent
Griffin

(10) Patent No.: US 12,644,793 B2
(45) Date of Patent: Jun. 2, 2026

(54) SECTORED FIBER OPTIC ELEMENT AND AN OPTICAL DETECTION SYSTEM USING THE SAME

(71) Applicant: Cyclone Biosciences, LLC, Phoenix, AZ (US)

(72) Inventor: Stephen E. Griffin, Peoria, AZ (US)

(73) Assignee: Cyclone Biosciences, LLC, Phoenix, AZ (US)

( * ) Notice: Subject to any disclaimer, the term of this patent is extended or adjusted under 35 U.S.C. 154(b) by 0 days.

(21) Appl. No.: 18/673,970

(22) Filed: May 24, 2024

(65) Prior Publication Data

US 2024/0402044 A1     Dec. 5, 2024

Related U.S. Application Data

(60) Provisional application No. 63/470,538, filed on Jun. 2, 2023.

(51) Int. Cl.
*G01M 11/00* (2006.01)
*B23K 26/38* (2014.01)
(52) U.S. Cl.
CPC ............. *G01M 11/33* (2013.01); *B23K 26/38* (2013.01)
(58) Field of Classification Search
CPC ............................... G01M 11/33; B23K 26/38
See application file for complete search history.

(56) References Cited

U.S. PATENT DOCUMENTS

| | | | | |
|---|---|---|---|---|
| 3,647,406 A | * | 3/1972 | Fisher ................. | G02B 6/3636 |
| | | | | 65/400 |
| 3,712,705 A | * | 1/1973 | Marcatili ................ | G02B 6/02 |
| | | | | 385/125 |
| 3,887,264 A | * | 6/1975 | Kompfner ........... | G02B 6/0288 |
| | | | | 385/124 |
| 4,026,693 A | * | 5/1977 | Sato ...................... | C03B 37/028 |
| | | | | 65/410 |
| 4,307,938 A | * | 12/1981 | Dyott ...................... | G02B 6/10 |
| | | | | 385/11 |
| 4,461,536 A | * | 7/1984 | Shaw .................... | G02B 6/283 |
| | | | | 374/E11.015 |

(Continued)

FOREIGN PATENT DOCUMENTS

WO     WO-2022087667 A1 * 5/2022 ......... G02B 27/0994

*Primary Examiner* — Peter Radkowski
(74) *Attorney, Agent, or Firm* — Quarles & Brady LLP; Yakov S. Sidorin

(57) ABSTRACT

An all-optical-fiber device (optionally produced with the use of laser machining) containing constituent optical fiber components in which the corresponding ends are segmented (and—in one specific case—quartered) and optionally tapered (while portions of the original cores and claddings are maintained) and operationally joined back to form an aggregate end of the device with the round aperture and the corresponding round facet. The end of the device may be cooperated with a quadrant detector for automatic guidance that is based on steering the output light, that was launched into the round facet and propagated through the device, toward the quadrant with the strongest signal in iterations until the signal in each quadrant of the detector is substantially balanced. Constituent optical fiber component(s) and overall detection system and method for manufacture and/or use of same.

5 Claims, 3 Drawing Sheets

(56)                References Cited

U.S. PATENT DOCUMENTS

| 4,630,890 | A  * | 12/1986 | Ashkin | G02B 6/2821 |
| | | | | 385/127 |
| 4,711,525 | A  * | 12/1987 | Feth | G02B 6/105 |
| | | | | 385/11 |
| 4,815,817 | A  * | 3/1989 | Levinson | G02B 6/03633 |
| | | | | 385/128 |
| 5,111,525 | A  * | 5/1992 | Hartouni | G02B 6/02 |
| | | | | 385/12 |
| 5,173,097 | A  * | 12/1992 | Jansen | C03B 37/01205 |
| | | | | 65/410 |
| 6,522,816 | B1 * | 2/2003 | Sugawara | G02B 6/3842 |
| | | | | 385/115 |
| 6,687,436 | B2 * | 2/2004 | Griffin | G02B 6/2552 |
| | | | | 385/43 |
| 7,110,626 | B2 * | 9/2006 | Tsai | G01H 9/004 |
| | | | | 385/12 |
| 7,620,290 | B2 * | 11/2009 | Rizoiu | A61B 18/20 |
| | | | | 606/167 |
| 7,848,607 | B2 * | 12/2010 | Monro | B29C 48/11 |
| | | | | 385/126 |
| 9,182,540 | B2 * | 11/2015 | Denner | A61F 9/00821 |
| 10,502,680 | B2 * | 12/2019 | Aquino Maier | G02B 6/4266 |
| 11,081,851 | B2 * | 8/2021 | Marciante | H01S 3/0672 |
| 2002/0021869 | A1 * | 2/2002 | Griffin | A61B 5/0075 |
| | | | | 385/31 |
| 2005/0109922 | A1 * | 5/2005 | Tsai | G01H 9/004 |
| | | | | 250/227.14 |
| 2005/0281530 | A1 * | 12/2005 | Rizoiu | A61B 18/26 |
| | | | | 385/146 |
| 2008/0118213 | A1 * | 5/2008 | Andrieu | G02B 6/0288 |
| | | | | 385/127 |
| 2009/0041061 | A1 * | 2/2009 | Shkunov | H01S 3/06704 |
| | | | | 65/382 |
| 2012/0069861 | A1 * | 3/2012 | Neuberger | G02B 6/02 |
| | | | | 264/1.24 |
| 2013/0170806 | A1 * | 7/2013 | Denner | G02B 6/14 |
| | | | | 385/129 |
| 2014/0288541 | A1 * | 9/2014 | Eshkol | A61B 17/30 |
| | | | | 606/7 |
| 2018/0235700 | A1 * | 8/2018 | Eshkol | A61B 18/1492 |
| 2018/0252635 | A1 * | 9/2018 | Aquino Maier | G01N 21/255 |
| 2021/0302647 | A1 * | 9/2021 | Huang | C03B 37/0253 |
| 2023/0327390 | A1 * | 10/2023 | Jain | G02B 6/03611 |
| | | | | 372/6 |

* cited by examiner 210 (optionally) to optical detector(s) and/or computer processor

DETAIL A

FIG. 3
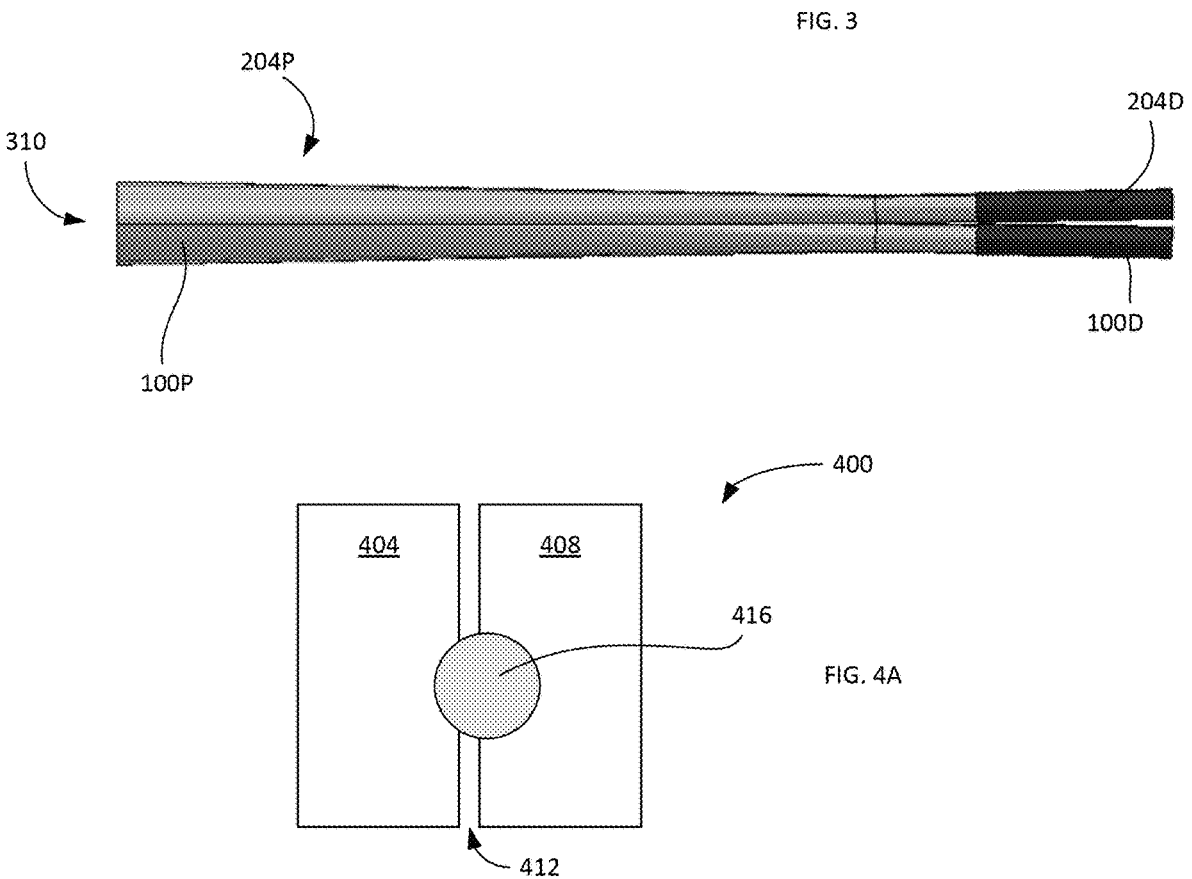
FIG. 4A
FIG. 4B
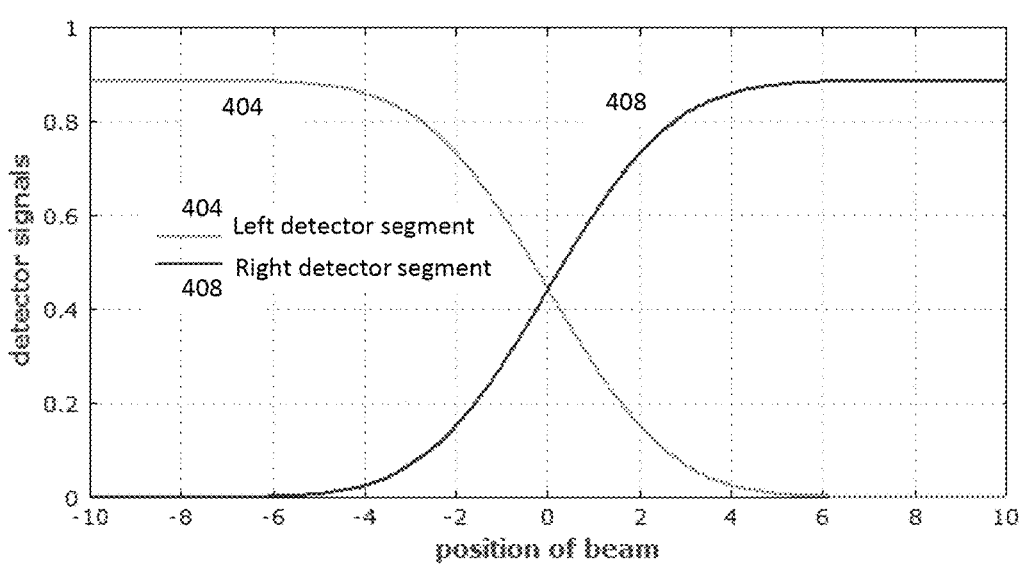

SECTORED FIBER OPTIC ELEMENT AND AN OPTICAL DETECTION SYSTEM USING THE SAME

CROSS-REFERENCE TO RELATED APPLICATIONS

This US patent application claims priority from and benefit of the U.S. provisional patent application No. 63/470,538 filed on Jun. 2, 2023, the entire disclosure of which is incorporated by reference herein.

TECHNICAL FIELD

The present invention relates to optical fiber structures dimensioned for use in positioning and/or navigational tools and modules and, more particularly, to optical fiber structures for use with optical quadrant detectors.

SUMMARY OF THE INVENTION

Embodiments of the invention provide an article of manufacture that includes a constituent optical fiber having an optical fiber core and an optical fiber cladding and dimensioned such that—at a proximal end of the optical fiber—a proximal cross-section of the constituent optical fiber includes and is defined by a sector of a circle. In at least one specific implementation, such sector is a minor sector of the circle or a semi-circle. In at least one specific implementation, the proximal end may be structured to be bound and/or limited by (in a plane transverse to an axis of the proximal end) (a) first and second radial surfaces extending along the axis of the proximal end and along a first radius and a second radius of the proximal cross-section, and (b) one or more of a bare curved surface of the optical fiber cladding and a surface of an outer buffer coating material. (In such specific implementation, the first and second radial surfaces may be configured as substantially planar surfaces.) Alternatively or in addition, and in at least one embodiment, the proximal end of the optical fiber may contain a fiber optic taper while the proximal cross-section is a cross-section of the fiber optic taper. Alternatively or in addition—and substantially in every implementation of the article—the optical fiber cladding may be present (as seen in the proximal cross-section) only at a curved surface of the optical fiber core and, optionally, at least one the first and second radial surfaces may be configured to carry a high-reflective coating thereon and not the optical fiber cladding. Alternatively or in addition—and substantially in every implementation of the article—a cross-section of the optical fiber drawn through a chosen axial point (that is separated from the proximal end) may be substantially axially symmetric. (In this latter case, optionally, at this chosen axial point, the chosen cross-section of the optical fiber element may incorporate a portion representing cross-section of the optical fiber core configured as a substantially cylindrical solid body.) In at least one—and preferably, more than one—embodiment, the article of manufacture includes multiple constituent optical fibers, each of which is structured to have its corresponding a proximal cross-section to be defined a corresponding sector of a circle (here, such multiple constituent optical fibers are disposed substantially in physical contact with one another along corresponding radial surfaces thereof at corresponding proximal ends). When the article of manufacture includes multiple constituent optical fibers, such multiple constituent optical fibers may be disposed in optical contact with one another along the corresponding radial surfaces (which surfaces are dimensioned to substantially conform to one another) and/or to have a proximal cross-section of the article of manufacture (defined at a proximal end of the article of manufacture) to be are substantially a complete circle with sectors formed by proximal ends of the multiple constituent optical fibers. At least in the latter case, a sector of a cross-section of a proximal end of a constituent optical fiber of the multiple constituent optical fibers may be a minor sector or a semi-circle, and/or at least one of the constituent sectors defined by corresponding proximal ends of the multiple constituent optical fibers may be dimensioned to subtend substantially a 90-degree angle. When the article of manufacture includes multiple constituent optical fibers, distal ends of such fiber may be left to remain spatially independently movable.

Embodiments of the invention further provide for an embodiment of the article of manufacture configured as outlined above to include multiple constituent optical fibers, which embodiment is complemented with an optical detector optically cooperated with a distal end of a constituent optical fiber and which is configured as a displacement sensor.

Embodiments of the invention further provide a method that includes at least a step of coupling a beam of light into a proximal end of the article of manufacture structured as a displacement sensor, and a step of repositioning one of the beam of light and the proximal end of the constituent optical fiber with respect to the other of the beam of light and the proximal end until irradiances of optical signals (registered at distal ends of multiple constituent optical fibers of the article of manufacture) define pre-determined numerical ratios of irradiances. In at least one specific case, the repositioning may be carried out until these irradiances are substantially equalized with one another. In at least one specific implementation, the step of repositioning includes repositioning one of the beam of light and the proximal end with respect to the other of the beam of light and the proximal end in a plane that is substantially parallel to a facet of the article of manufacture at the proximal end of the article. The step of coupling may include coupling the beam of light into a facet, of the article of manufacture, that is defined by a combination of corresponding facets of proximal ends of the multiple constituent optical fibers of such article when the corresponding facets are disposed substantially in one plane.

Embodiments additionally provide a method that includes machining a proximal end of a chosen optical fiber to form the article of manufacture structured according to an embodiment outlined above. (In at least one specific case, such machining may include exposing an outer surface of the proximal end of the chosen optical fiber to laser light.) Optionally, the method may employ the steps of (a) forming a fiber optical taper at the proximal end of the chosen fiber proximal end prior to the step of machining, and/or (b) depositing a high-reflection coating on the first and second radial surfaces of the chosen optical fiber of such article of manufacture. Alternatively or in addition, and substantially in every embodiment of the method, the step of machining may include shaping multiple optical fibers (each of which includes a corresponding optical fiber core and a corresponding optical fiber cladding) such that, at a corresponding proximal end of each of these multiple optical fibers, a proximal cross-section includes and is defined by a sector of a circle (in this case, the method may additionally include a step of bringing corresponding radial surfaces of these multiple optical fibers substantially in optical contact with one another). When an embodiment of the method includes such step of bringing, the step of bringing may include (i) forming a gadget that has a proximal end thereof with a cross-section defined by substantially a complete circle having sectors represented by corresponding sectors of cross-sections of corresponding proximal ends of the multiple optical fibers while having a distal end thereof defined by a combination of independently spatially repositionable distal ends of the multiple optical fibers; and/or (ii) forming the gadget having the proximal end configured as a composite optical fiber element with a composite core region and a composite cladding region (here, the composite core region of the formed article of manufacture at the proximal end of the article includes at least portions of core regions of the multiple optical fibers as defined at the proximal ends of the multiple optical fibers, with such proximal core regions being connected to one another, and the composite cladding region of the article of manufacture includes at least portions of cladding regions of the multiple optical fibers as defined at their proximal ends, with such portions of cladding regions being connected to one another). Alternatively or in addition, and substantially in every implementation, the method may include a step of optically cooperating a distal end of an optical fiber of the article of manufacture with a corresponding optical detector.

Embodiments further provide an article of manufacture that includes a fiber optic splitter (having an optical fiber component with a single proximal end and multiple spatially distinct distal ends), in which the optical fiber component at the single proximal end has a substantially cylindrical core region formed by a combination of spatially distinct multiple sectors of a cylinder, with (i) the spatially distinct multiple sectors of a cylinder being connected to one another at radial surface of such sectors along defined corresponding sector-separating planes, and with (ii) each of such corresponding sector-separating planes extending along and containing an axis of the single proximal end. In at least one implementation of the article, the multiple spatially distinct distal ends are spatially independent and repositionable independently from one another and/or the optical fiber component at the single proximal end has a cladding region that include an optical cladding material covering an outer surface of the substantially cylindrical core region and/or a number of multiple spatially independent distal ends is equal to a number of the multiple sectors of the cylinder and/or the article of manufacture is devoid of an optical component that is not part of an optical fiber. In at least one specific embodiment, the article may additionally include a layer of material disposed between immediately neighboring each other first and second sectors of the multiple sectors along a corresponding sector-separating plane (here, such layer of material is configured to increase reflectance of light incident onto said corresponding sector-separating plane from inside the first of the multiple sectors and/or from inside the second of the multiple sectors). At least one embodiment of the article may be structured to include an optical detector cooperated with at least one of the multiple spatially-distinct distal ends to receive light coupled into a corresponding of the multiple sectors of the cylinder at the proximal end and channeled through the fiber optic splitter.

BRIEF DESCRIPTION OF THE DRAWINGS

The invention will be more fully understood by referring to the following Detailed Description of Specific Embodiments in conjunction with the Drawings, of which:

FIG. 3 provides an additional illustration of the optical fiber device of FIGS. 2A, 2B;

FIG. 4A schematically illustrates a dual-segment photodiode with a spot of laser light indicated on such photodetector;

FIG. 4B contains plots schematically illustrating output signals from a photodiode of FIG. 4A as functions of the light beam position on such photodiode.

Figures 1A, 1B:
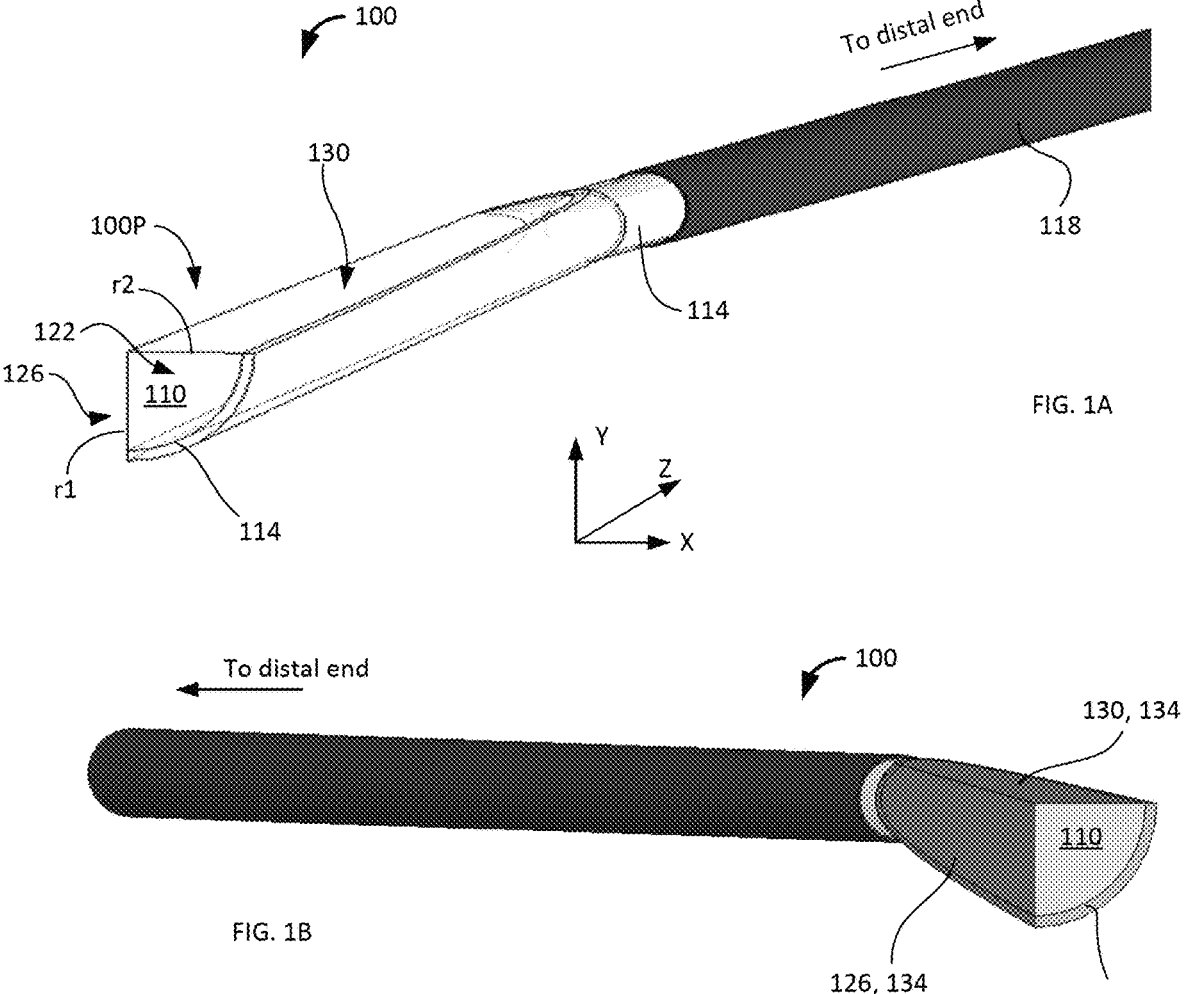
FIGS. 1A, 1B schematically illustrate an embodiment of an optical fiber element configured according to the idea of the invention.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

While it is well recognized that position-sensitive or navigational tools and systems (that is, those tools and systems that are generally configured for centering, nulling, and/or detecting and measuring of position displacements) are rather viable when such systems employ position-sensitive detectors or devices (referred to herein as PSDs), quite often the very geometry of such systems simply prevents the use of a PSD thereby leaving the user to decide on how to achieve his goal of navigation without having the advantage of utilizing such a reliable component as the PSD.

A position-sensitive detector is a photo-detector with which one can measure the position of a light spot in one or two dimensions, normally with a relatively high speed. (Quite often, in practice, such light spot is that produced by a laser beam hitting the detector.) One can then accurately measure insubstantial reflections of such a beam, for example. Such detectors can be used to monitor beam alignment (the so-called laser spot tracking methodology) and (within a feedback system) to stabilize the position of a laser beam (which is often referred to as an auto-aligning methodology). Another application is to measure distances by triangulation. One principle for position sensing is to use a kind of segmented photodetector to measure optical intensities for a few or even many different spatial positions (segments of a photodetector). From those data, one can calculate the position of the light spot. In the simplest case, schematically illustrated in FIG. 4A, a photodiode 400 with two segments 404, 408 (a dual-segment photodiode or dual-cell photodiode) is used, with only a narrow gap 412 between the segments. The beam radius of the incident beam of light (see the spot of laser light 416) is typically chosen such that at least for beam positions in the intermediate range each of the detector segments 404, 408 receives some optical power (FIG. 4B). From the relative signals related to the two detector segments, one can calculate the position of the beam. (Notably, for this kind of device one obtains a nonlinear dependence of the signal on the position; one may have to apply some linearization technique.) In addition, the relative intensities depend not only on the beam position, but also on the beam radius. For those reasons, segmented diodes such as that of FIG. 4A or related quadrant diodes or photodetectors are not necessarily ideally suited for quantitative position measurements. They are useful, however, for checking whether a beam is properly centered (that is, as centering indicators), e.g. within a feedback system for automatic alignment. For example, such devices may be used in systems configured for optical data storage (CD-ROM, DVD etc.). Similarly, one can use a quadrant photo-diode with four detector segments or even photodiode arrays (that contain a larger number of photodiode segments either in a linear array for one-dimensional position sensing or on a two-dimensional grid), with which one can monitor positions in two dimensions.

The situation when conventional delivery of a light beam to a segmented optical detector either is not practical or is substantially prevented by a design of the overall apparatus containing such an optical detector begs a question of how to proceed with the navigational measurements.

A practical problem of related art manifesting in circumstantial situations when geometry and/or operational conditions of a navigational system (configured for centering, nulling, and/or detecting and measuring of position displacements) does not allow for the use of a position sensing optical detector system (such as, in a specific example, a quadrant detector having four constituent optical detectors) is solved by devising an optical fiber based device or apparatus that is judiciously structured to include multiple constituent optical fibers (which may interchangeably referred to herein as multiple constituent optical fiber elements of such device or apparatus) that are judiciously re-shaped along corresponding axes and that deliver an optical signal used for sought-after navigation to different constituent optical detectors of the position sensing optical detector system.

In particular, embodiments of the optical fiber-based device or system or article of manufacture as discussed below are segmented—that is, include at least one constituent optical fiber strand or element that, in operation, is appropriately optically paired with a chosen, single one of the constituent optical detectors of the position sensing optical detector system at the distal end of the device and that has the proximal end of the device judiciously dimensioned to have a cross-section forming/representing/bound by a perimeter of a sector of a circle. A plurality of constituent optical fiber strands or elements configured according to the idea of the invention may be appropriately juxtaposed with one another such as to bring the ends of such constituent optical fibers (each forming a corresponding sector of a circle in a cross-section) in physical contact with one another to form (at one end of the fiber based article device resulting from such juxtaposition) a cross section that includes and is defined by multiple sectors of the circle sharing circle radii with one another while at an opposite end of the device each of the constituent different fiber optic strands remains spatially independently repositionable and—if so desired-cooperated with the respectively corresponding constituent optical detector of the sensing optical detector system.

Understandably, the combination of an embodiment of a single, chosen optical fiber element shaped as mentioned above with a corresponding one of the multiple optical detectors of the optical detection system (or with one of the multiple segments of a multi-segment optical detection system) or a combination of an optical fiber device incorporating multiple of such optical fiber elements with the optical detection system are also within the scope of the invention.

To this end, FIGS. 1A, 1B schematically illustrate an embodiment 100 of a single, stand-alone optical fiber (optical fiber element or strand) dimensioned according to the idea of the invention. The optical fiber conventionally includes an optical fiber core and the optical fiber cladding at each point of the embodiment 100. However, in stark contradistinction with optical fibers of related art, the proximal end 100P of the embodiment 100 is dimensioned such that the optical fiber core 110 is not forming a complete circle in a cross-section but, instead, is dimensioned to define only a sector of a complete circle in such a cross section. In other words, a cross-section of the proximal end 100P (in a plane that is substantially transverse to an axis of the end 100P) is defined by and includes a sector of a circle (as seen at the optical facet 122 of the element 100). A portion 114 of the corresponding optical fiber cladding region, while indicated, generally may or may not be present at the proximal end. The outer buffer coating material or jacket of the fiber element 100 is indicated as 118).

As is known in related art, a sector of a circle is a pie-shaped part of a circle enclosed by two radii of the circle and the portion of the circle subtended between these radii. Phrased differently, a part of the circle that is bound by portions of the circumference (also known as an arc) of the circle and two radii of the circle, each of which meets with a corresponding endpoint of the arc, forms a sector. Notably, when a circle is divided into only two constituent sectors, such sectors are generally a minor sector and a major sector (the large portion of the circle is the major sector whereas the smaller portion is the minor sector: a minor sector of a circle is the sector in which the angle between the radii forming a boundary of the second is substantially smaller than 180 degrees). When a sector is a semi-circle, the circle contains only two equal-sized sectors. (In comparison, a sector of a cylinder is defined as a portion of a cylinder bound, in a plane transverse to an axis of the cylinder, by two radially extending planes—that is, two planes each of which contains the axis of the cylinder and which form a dihedral angle—and a portion of the outer surface of the cylinder subtended by such dihedral angle.

In at least one implementation—and as is shown in the schematic of FIGS. 1A, 1B—the proximal end 100P is bound (in a plane transverse to the axis of the proximal end, which axis is generally parallel to the z-axis of the local system of coordinates) by first and second radial surfaces 126, 130 (that extend along the axis of the proximal end and along first and second radii r1, r2 of the circle in the cross-section of the proximal end) and, optionally, by one or more of a bare curved surface of the optical fiber cladding 114 and a surface of an outer buffer coating material 118. The proximal end of the specific implementation 100 of FIGS. 1A, 1B is shown to include a portion 114 of the optical fiber cladding and not to be covered with the coating/jacket 118. As a result of such configuration, within the limits of the proximal end the optical fiber cladding may be present (and is present, in the embodiment 100) only at a curved surface limiting the optical fiber core region 110. In a specific implementation, at least one of the radial surfaces 126, 130 is substantially a planar surface. Optionally, the proximal end 100P can be dimensioned as an optical fiber taper (that is a fiber optic element having a radius of the optical fiber core portion that varies along the length of such fiber optic element), as shown in the specific example FIGS. 1A, 1B. Optionally, at least one of the radial surfaces 126, 130, and the outer surface of the optical fiber cladding 114 in the proximal end region can be additionally coated with a high-reflectance coating(s) 134 (thin film filter(s), for example, possessing high reflectance at a wavelength of light supported as an optical mode by the fiber element 100). FIG. 1B illustrates the situation when such coating 134 is present on each of the three side surfaces that limit and define the cross-sectional sector of the proximal end 100P.

At the same time, a cross-section of the distal end of the optical fiber element 100 contains the optical fiber core 100 that is dimensioned as a substantially cylindrical solid body while the optical fiber cladding 114 is configured as a substantially cylindrical hollow body circumscribing the optical fiber core, thereby defining such cross-section to be substantially axially symmetric. Generally, the sector of a circle, defining the shape of a cross-section of the embodiment 100 at the proximal end 100P may be, understandably, a major sector, a minor sector, or a semi-circle.

The method of fabrication of the optical fiber element such as the element 100 may involve a process of machining a proximal end of a given optical fiber (for example, to form the radial surfaces 126, 130) and, optionally, forming a fiber optical taper prior to such machining and/or depositing a high-reflection coating on at least one of the radial surfaces 126, 130 after such machining.

Figure 2A:
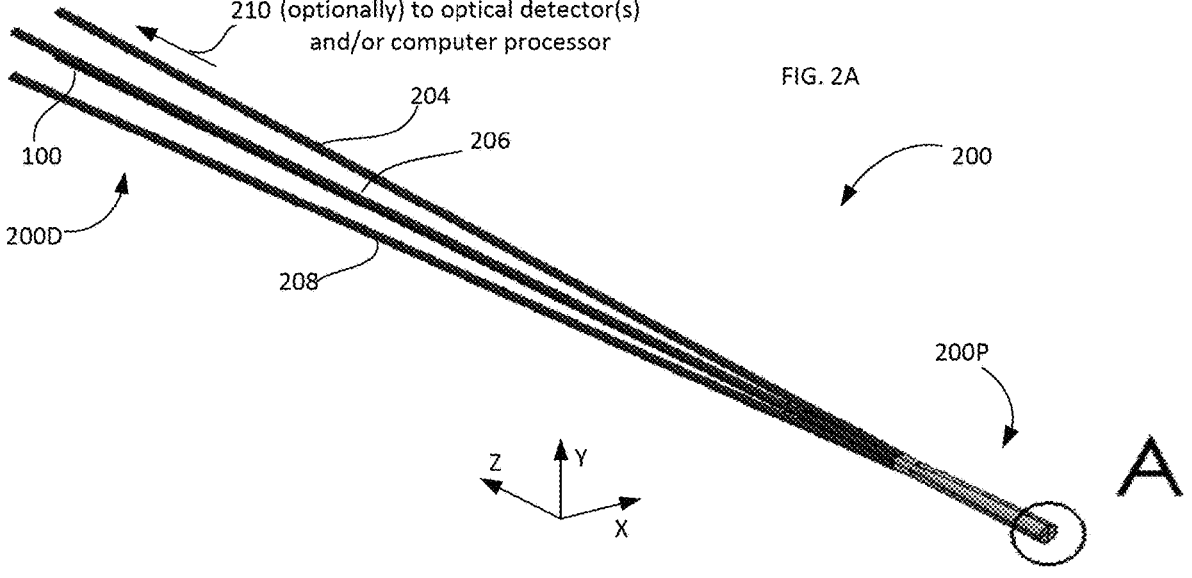
FIGS. 2A, 2B present an embodiment of the optical fiber device that incorporates multiple optical fiber elements structured similarly to that of FIGS. 1A, 1B.
Figure 2B:
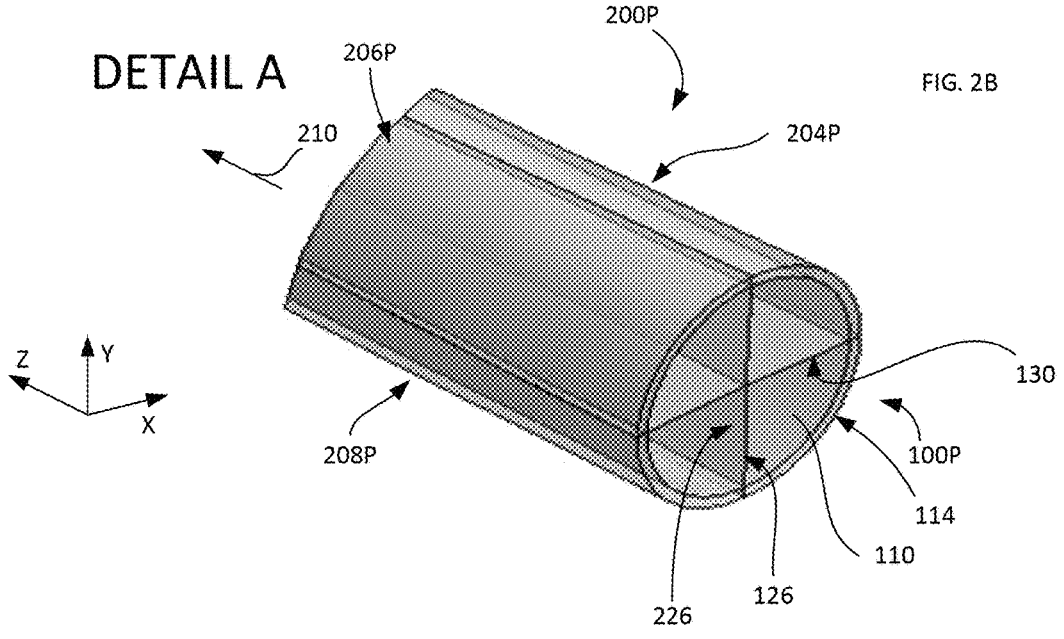

FIGS. 2A, 2B schematically illustrate the embodiment 200 of an optical fiber device that includes multiple optical fibers each of which is structured similarly to that of FIGS. 1A, 1B. These multiple (four, as shown: 100, 204, 206, 208) constituent optical fibers are mechanically and operationally joined and/or juxtaposed and/or grouped together to form a device in which these constituent optical fibers are disposed in physical contact with one another (that is, that are touching physically, along the corresponding radial surfaces limiting the corresponding sectored proximal ends of constituent optical fibers) to define the proximal end 200P of the device 200. As shown in FIG. 2B, one of the constituent proximal ends of the constituent optical fiber elements of the device 200 is the end 100P of the optical fiber element 100 of FIG. 1A, 1B.

In the specific non-limiting example of FIGS. 2A, 2B, the device 200 includes four constituent optical fiber elements 100, 204, 206, 208. The proximal ends of the constituent optical fibers 204, 206, 208 are respectively numbered as 204P, 206P, and 208P. Preferably—but not necessarily—the physical contact between the respectively corresponding radial surfaces defining a sector of each of the constituent optical fiber elements of the device 200 are, in addition, in optical contact with one another—that is, such surfaces are juxtaposed with one another with a possible remaining separation between the two that is smaller than the wavelength of light such that optical interference fringes are not observable in light propagating transversely to both of such surfaces. Even more preferably, the respectively corresponding surfaces—for example, surface 126 and 226 of the constituent proximal ends 100P and 208P, as shown in FIG. 2B—may also be bonded to one another while preserving the optical contact between the two (in this case, the two conforming surfaces 126, 226 may be joined together by being held purely by intermolecular forces).

Preferably—but not necessarily—the dimensions of the constituent proximal ends (here—100P, 204P, 206P, and 208P) of the constituent fibers forming the embodiment 200 are substantially equal, that is the constituent proximal ends 100P, 204P, 206P, and 108P are all dimensioned in exactly the same a fashion (discussed above in reference to FIG. 1A, 1B) When this is the case, the corresponding portions of the optical fiber cladding regions of the proximal ends 100P, 204P, 206P, 208P could be substantially merging with one another along the corresponding radial surfaces of each of the constituent sectors in the cross section of the proximal end 200P of the embodiment 200, thereby forming the aggregate optical cladding region of the proximal end 200P around the group of the constituent optical core regions. Furthermore, when this is the case, a cross-section of the proximal end 200P of the optical fiber device 200 is substantially represented by a complete circle with sectors defined by proximal ends of the constituent multiple optical fibers and separated from one another in such cross-section by corresponding well-defined radial surfaces of the constituent optical fibers 100, 204, 206, 208. With that proviso, at least some of the constituent sectors may be dimensioned as a minor sector and/or as a semicircle, for example.

Referring again to FIG. 2A, distal ends of the constituent optical fibers 100, 204, 206, 208 (forming, as a group, the distal end 200D of the embodiment 200) remain spatially distinct from one another and/or spatially independently moveable and, in operation, can be juxtaposed with corresponding optical detector(s) (not expressly shown but indicated in FIG. 2A). s (For example, in the specific case of a four-segment proximal end 200P of the embodiment 200, the distal ends of the constituent fiber elements 100, 204, 206, 208 can be cooperated with an optical quadrant detector (not shown). When and if so cooperated/juxtaposed, the combination of the embodiment of the optical fiber device (here, device 200) and the (group of) optical detector(s) forms an embodiment of a displacement sensor or more generally, an embodiment of an optical navigation system thereby overcoming and solving the problem of related art alluded to above.

FIG. 3 schematically depicts the proximal end 200P of the embodiment 200 as seen in the –x direction (in the local system of coordinates indicted in FIG. 2A), with the distal ends 100P, 204P of the constituent optical fiber elements 100, 204 indicated. The proximal facet of the embodiment 200 is denoted in FIG. 3 as 310.

The skilled artisan having the advantage of this disclosure will now readily appreciate that, stated differently, an implementation of the idea of the invention results in an apparatus that includes a fiber optic splitter a part of it is an optical fiber component with a single proximal end and multiple spatially-distinct distal ends. The optical fiber component at the single proximal end has a substantially cylindrical core region defined by a combination of multiple sectors of a cylinder that are connected with one another at corresponding sector-separating planes, where each of the corresponding sector-separating planes extends along and contains an axis of the single proximal end (while, at the same time, the multiple spatially-distinct distal ends are spatially independent and repositionable independently from one another). Generally, such fiber optic splitter is devoid of an optical component that is not part of an optical fiber. In at least one case, the apparatus additionally includes an optical detector system cooperated with at least one of the multiple spatially-distinct distal ends to receive light coupled into a corresponding of the multiple sectors of the cylinder at the proximal end and channeled through the fiber optic splitter.

Embodiments of the invention additionally include a method for measuring a position displacement, according to which a beam of light is coupled into a facet of an article of manufacture that includes an embodiment of the optical fiber device such as the device 200 (the distal ends of the constituent multiple optical fiber elements of which are optically cooperated with respectively corresponding optical detectors) and then at least one of such beam of light and such facet is repositioned with respect to the other until irradiances of optical signals, registered at distal ends of constituent multiple optical fiber elements define pre-determined numerical ratios of irradiances as registered at the optical detectors.)

While not necessarily indicated in Figures, the use of an embodiment structured according to the idea of the invention may be governed by a processor controlled by instructions stored in a memory (for example, when the embodiment including multiple optical fiber components is operated in conjunction with an optical detector system the constituent optical detector components of which are positioned to receive light from corresponding outputs of the multiple optical fiber components. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Understandably, a computer program product containing program code(s) embodying and/or governing the operation of at least one implementation of the idea of the invention remain within the scope of the invention—and, in particular, the embodiment of a computer program product for operating a position-displacement detection system. Such computer program product may, in one implementation, include a computer usable medium having computer readable program code thereon. The computer readable program code may include (i) program code for determining a corresponding irradiance of light received at a corresponding optical detector, of the optical detection system, from a corresponding one of multiple spatially distinct distal ends of a fiber optic device, the fiber optical device having a single proximal end and said multiple spatially distinct distal ends (where the single proximal end has a substantially cylindrical core region formed by a combination of spatially distinct multiple sectors of a cylinder, the spatially distinct multiple sector of a cylinder being connected with one another at corresponding sector-separating planes, where each of the corresponding sector-separating surfaces extends along and contains an axis of the single proximal end); (ii) program code for determining a moment of time, during mutual repositioning of the single proximal end and a beam of input light, incident onto an input surface of the single proximal end, multiple corresponding irradiances registered at multiple optical detectors of the optical detection system, are substantially equal to one another; and (iii) program code for generating a user-perceivable indicia when said moment of time has been determined.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. Other specific examples of the meaning of the terms "substantially", "about", and/or "approximately" as applied to different practical situations may have been provided elsewhere in this disclosure.

The term "to conform" is defined as "to possess substantially the same shape, outline, and/or contour".

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

For the purposes of this disclosure and the appended claims, the expression of the type "element A and/or element B" is defined to have the meaning that is equivalent to that of the expression "at least one of element A and element B".

The disclosure of each reference and/or patent document cited herein is incorporated herein by reference.

While the invention is described through the above-described specific non-limiting embodiments, it will be understood by those of ordinary skill in the art that modifications to, and variations of, the illustrated embodiments may be made without departing from the inventive concepts disclosed herein. The disclosed aspects may be combined in ways not listed above. Accordingly, the invention should not be viewed as being limited to the disclosed embodiment(s).

The invention claimed is:

1. An article of manufacture comprising:
   an optical fiber having
      an optical fiber core; and an optical fiber cladding, wherein, at a proximal end thereof, a proximal cross-section of the optical fiber is limited to and is defined by a sector of a circle.

2. An article of manufacture according to claim 1, wherein, in a plane transverse to an axis of the proximal end, the proximal end is bound and/or limited by (a) first and second radial surfaces extending along the axis of the proximal end and along a first radius of the proximal cross-section and a second radius of the proximal cross-section, respectively, and (b) one or more of a bare curved surface of the optical fiber cladding and a surface of an outer buffer coating material.

3. An article of manufacture comprising:

constituent multiple optical fibers according to claim 2, wherein said constituent multiple optical fibers are disposed substantially in physical contact with one another along corresponding radial surfaces thereof at corresponding proximal ends of the optical fibers.

4. An article of manufacture according to claim 3, wherein a proximal cross-section of said article of manufacture defined at a proximal end of the article of manufacture is substantially a complete circle with sectors formed by proximal ends of the constituent multiple optical fibers.

5. An article of manufacture according to claim 4, wherein a sector of a cross-section of a proximal end of a constituent optical fiber of said multiple constituent optical fibers is a minor sector or a semi-circle.

* * * * *